US008348751B2

(12) United States Patent
Rist

(10) Patent No.: US 8,348,751 B2
(45) Date of Patent: Jan. 8, 2013

(54) BILL ACCEPTOR FOR A GAMING MACHINE

(75) Inventor: James Rist, Lane Cove (AU)

(73) Assignee: Aristocrat Technologies Australia Pty Ltd. (AU)

( * ) Notice: Subject to any disclaimer, the term of this patent is extended or adjusted under 35 U.S.C. 154(b) by 0 days.

(21) Appl. No.: 13/030,783

(22) Filed: Feb. 18, 2011

(65) Prior Publication Data

US 2011/0144796 A1 Jun. 16, 2011

Related U.S. Application Data

(63) Continuation of application No. 12/686,057, filed on Jan. 12, 2010, which is a continuation of application No. 10/020,484, filed on Dec. 21, 2001, now Pat. No. 7,677,969.

(51) Int. Cl.
*A63F 13/02* (2006.01)
*A63F 13/08* (2006.01)

(52) U.S. Cl. .......... 463/25; 463/47

(58) Field of Classification Search .......... 463/25, 463/47; 194/200, 205-213, 215, 302
See application file for complete search history.

(56) References Cited

U.S. PATENT DOCUMENTS 4,291,294 A 9/1981 Chase
4,546,869 A * 10/1985 Dean et al. .......... 194/303
5,564,548 A * 10/1996 Dobbins et al. .......... 194/317
5,611,730 A * 3/1997 Weiss .......... 463/20
5,700,195 A 12/1997 Halic
5,730,272 A * 3/1998 Dobbins et al. .......... 194/317
5,836,818 A * 11/1998 Jones et al. .......... 463/29
5,931,277 A 8/1999 Allan et al.
5,970,165 A 10/1999 Itako
6,162,122 A 12/2000 Acres et al.
6,247,572 B1 6/2001 Neborsky et al.
6,506,116 B1 1/2003 Sunaga et al.
6,564,997 B1 5/2003 Juds
6,641,034 B1 11/2003 Oki et al.
6,712,191 B2 * 3/2004 Hand .......... 194/344
6,722,487 B1 * 4/2004 Bell .......... 194/302
6,742,644 B1 6/2004 Heidel
6,899,215 B2 5/2005 Baudat et al.
6,923,306 B2 * 8/2005 Hand .......... 194/350
7,014,029 B2 3/2006 Winters
7,390,257 B2 6/2008 Paulsen et al.
2001/0013456 A1 8/2001 Ishida et al.
2002/0125627 A1 * 9/2002 Hand .......... 271/10.01
2003/0111316 A1 6/2003 Winters

* cited by examiner

*Primary Examiner* — David L Lewis
*Assistant Examiner* — Matthew D. Hoel
(74) *Attorney, Agent, or Firm* — McAndrews, Held & Malloy, Ltd.

(57) ABSTRACT

A bill acceptor 24.2 for a gaming machine includes a receiving zone for receiving a tendered bill. A sensing device 48 is arranged at an input region of the receiving zone for sensing at least one characteristic of the bill A controller 52 is in communication with the sensing device 48 for receiving an output signal from the sensing device 48. An annunciator 58 is controlled by the controller 52 to be activated when a bill acceptance rate of the controller 52 drops below a predetermined threshold.

10 Claims, 5 Drawing Sheets

BILL ACCEPTOR FOR A GAMING MACHINE

CROSS-REFERENCE TO RELATED APPLICATIONS/INCORPORATION BY REFERENCE

This application is a CONTINUATION of U.S. patent application Ser. No. 12/686,057, filed on Jan. 12, 2010, which is a CONTINUATION of U.S. patent application Ser. No. 10/020,484, filed on Dec. 21, 2001, entitled "BILL ACCEPTOR FOR A GAMING MACHINE", the entirety of each above referenced application is incorporated herein by reference.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

This invention relates to a gaming machine. More particularly, the invention relates to a bill acceptor for a gaming machine and to a method of operating a bill acceptor of a gaming machine.

It is becoming more and more prevalent for gaming machines to accept "paper" money or bank notes from players wishing to play gaming machines. As a result, more and more gaming machines include bill acceptors for such bank notes.

It is important that a bill acceptor be extremely accurately set to ensure that the insertion of false or counterfeit bank notes is kept to a minimum thereby minimising losses which the gaming machine operator may suffer.

Because the bill acceptor is a sensitive item, it may have a tendency to have a high rejection rate. As a result, a gaming machine equipped with such a bill acceptor may not be frequented by players wishing to use bank notes due to the rejection of the bank notes by the bill acceptor.

It is also desirable that, should one wish to alert a technician to the fact that a bill acceptor may be malfunctioning, it be done in a discrete manner so as not to disturb a player playing that gaming machine who may have been using another form of credit such as coins, tokens, cards, or the like.

BRIEF SUMMARY OF THE INVENTION

According to a first aspect of the invention, there is provided a bill acceptor for a gaming machine, the bill acceptor comprising:

a receiving zone for receiving a bill;

a sensing device at an input region of the receiving zone for sensing at least one characteristic of the bill;

a controller in communication with the sensing device for receiving an output signal from the sensing device; and an annunciator controlled by the controller to be activated when a bill acceptance rate of the controller drops below a predetermined threshold.

The term "bill" is to be understood in this specification, unless the context clearly indicates otherwise, as a form of paper currency such as a bank note. Further, the term "bill acceptance rate" as it is used in this, specification is to be understood, unless the context clearly indicates otherwise, as the number of bills which are accepted in a batch of bills tendered to the gaming machine. It does not refer to the speed with which the controller accepts or rejects a tendered bill.

The receiving zone may incorporate a platen on which the bill is received and a slot at an end of the platen into which the bill is to be inserted. The platen may be arranged in a midtrim of the machine.

The sensing device may be arranged within the machine, inwardly of the slot. The sensing device may sense at least one of optical, magnetic and dimensional characteristics of the bill. In use, more than one of these characteristics may be sensed by the sensing device to reduce the prevalence of fraudulent or counterfeit bills.

The receiving zone may include an attracting means for indicating to a patron where the bill is to be inserted into the slot. The attracting means may comprise an array of illuminating elements arranged in the platen of the receiving zone.

In addition, the annunciator may also be arranged in the receiving zone.

The controller may cause the array of illuminating elements to be illuminated in a predetermined, first pattern and the annunciator may be implemented in the form of an illumination of the illuminating elements in a second, different pattern. The illuminating elements may be, for example, light emitting diodes (LED's). The LED's may be arranged in two rows. The rows may converge towards the slot. The first pattern may comprise sequential energising of corresponding LED's in each row followed by sequential de-energising of the corresponding LED's in each row. This may then constitute the first pattern. Upon completion of the first pattern, all the LED's may be energised so that they are all simultaneously illuminated and this may constitute the second pattern being the implementation of the annunciator.

Accordingly, the second pattern may be activated after completion of the first pattern when the bill acceptance rate has dropped below said predetermined threshold. This predetermined threshold may be set as desired by an operator of the gaming machine. For example, the threshold may be a bill acceptance rate of about 70% to 90% of tendered bills, preferably about 75% to 85% of tendered bills and, optimally, about 80% of tendered bills.

The gaming machine may be connected to a network. When the controller of such a gaming machine is connected to the network, a network monitoring system may monitor the acceptance rate of bills by the controller and may activate an alarm means when the acceptance rate drops below the predetermined threshold. This gives venue operating and service personnel an on-line and immediate indicator of the performance of the bill acceptor of the gaming machine. The monitoring system may activate a visual or audible alarm indicating the need for attention to the bill acceptor.

According to a second aspect of the invention, there is provided a method of operating a bill acceptor of a gaming machine, the method including the steps of:

sensing at least one characteristic of a bill inserted into the bill acceptor;

monitoring a bill acceptance rate by a controller; and activating an annunciator when the bill acceptance rate drops below a predetermined threshold.

The method may include energising illuminating elements of the bill acceptor in a predetermined pattern and, when the bill acceptance rate drops below said threshold, energising the illuminating elements in a second, different pattern, said second pattern of illumination of the illuminating elements serving as the annunciator. The second pattern of illumination of the illuminating elements may follow completion of the first pattern.

As indicated above, when the gaming machine is connected to a network, the method may include transmitting a signal on the network to which the gaming machine is connected to a network monitoring system to activate an alarm means when the bill acceptance rate drops below said predetermined threshold.

BRIEF DESCRIPTION OF SEVERAL VIEWS OF THE DRAWINGS

The invention is now described by way of example with reference to the accompanying drawings in which.

DETAILED DESCRIPTION OF THE INVENTION

Figure 1:
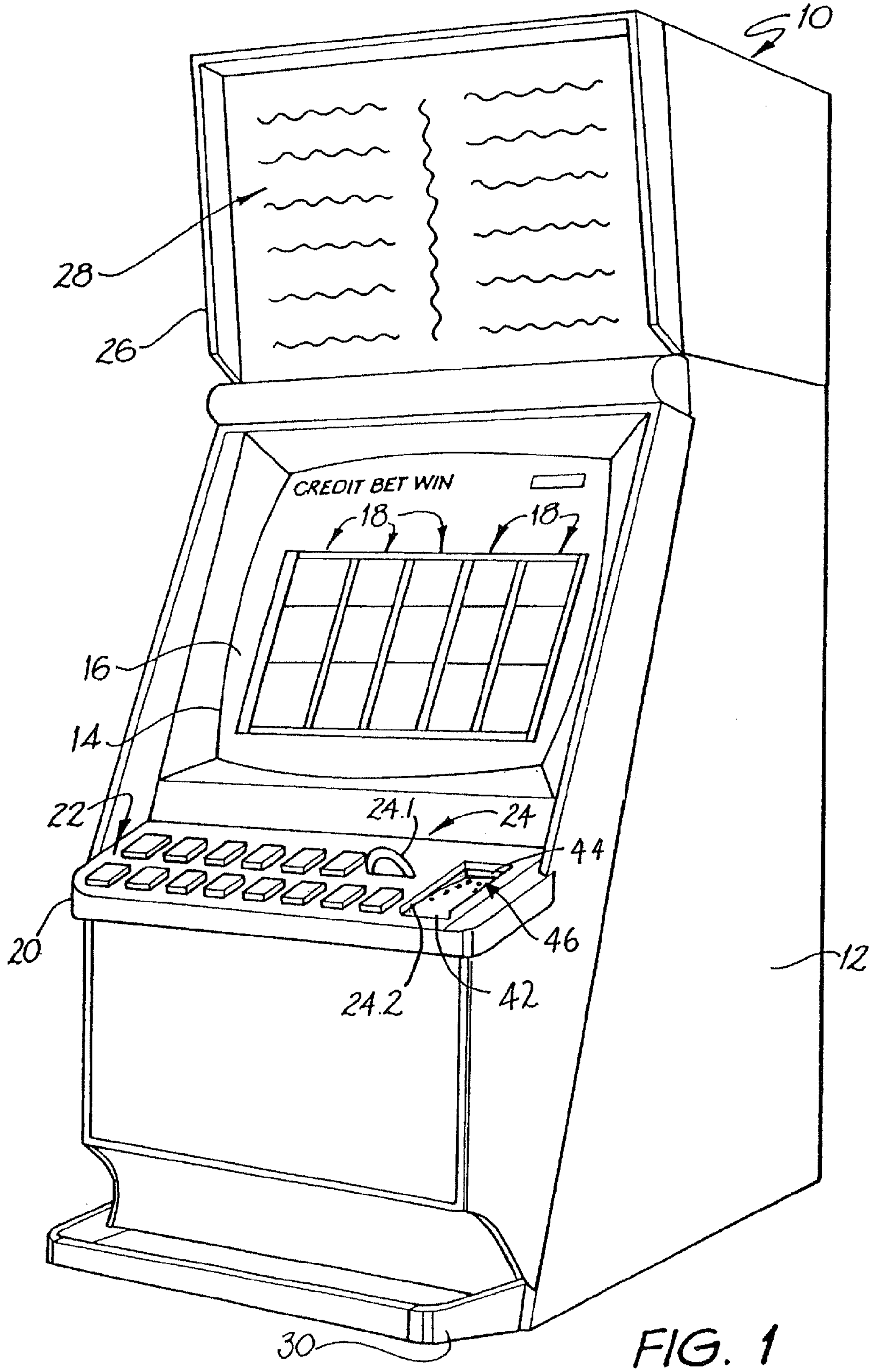
FIG. 1 shows a perspective view of a gaming machine.

In FIG. 1, reference numeral 10 generally designates a gaming machine, including a game, in accordance with the invention. The machine 10 includes a console 12 having a video display unit 14 on which a game 16 is played, in use. The game 16 is a spinning reel game which simulates the rotation of a number of spinning reels 18. A midtrim 20 of the machine 10 houses a bank 22 of buttons for enabling a player to play the game 16. The midtrim 20 also houses a credit input mechanism 24 including a coin input chute 24.1 and a bill collector 24.2. The mechanism 24 may, in addition to the coin input chute 24.1 and the bill collector 24.2, include a credit card reader (not shown) or any other type of validation device.

The machine 10 includes a top box 26 on which artwork 28 is carried. The artwork 28 includes paytables, details of bonus awards, etc.

A coin tray 30 is mounted beneath the console 12 for cash payouts from the machine 10.

Figure 2:
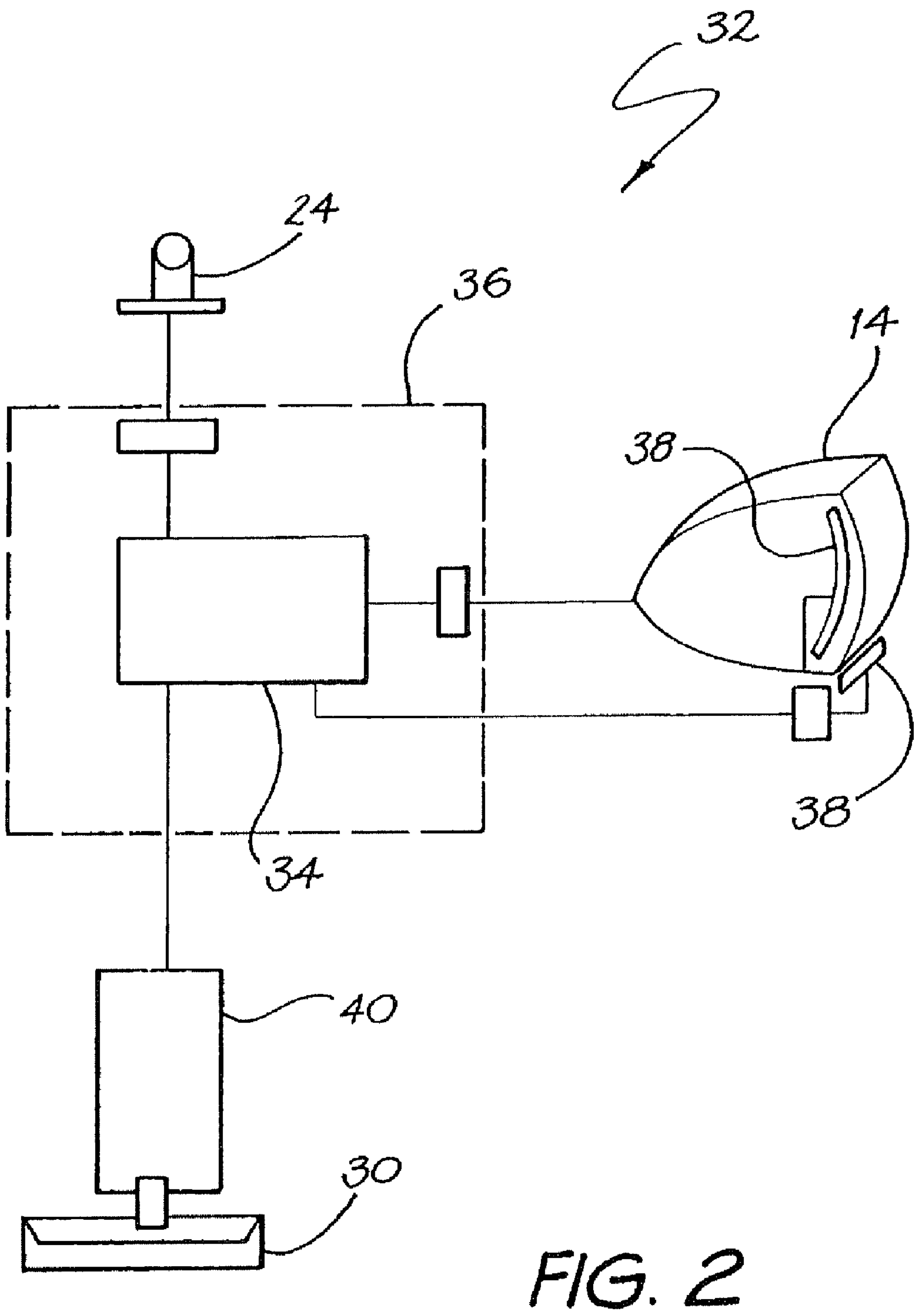
FIG. 2 shows a block diagram of a control circuit of the gaming machine.

Referring to FIG. 2 of the drawings, a control means or control circuit 32 is illustrated. A program which implements the game and user interface is run on a processor 34 of the control circuit 32. The processor 34 forms part of a controller 36 which drives the screen of the video display unit 14 and which receives input signals from sensors 38. The sensors 38 include sensors associated with the bank 22 of buttons and touch sensors mounted in the screen. The controller 36 also receives input pulses from the mechanism 24 indicating that a player has provided sufficient credit to commence playing.

Finally, the controller 36 drives a payout mechanism 40 which, for example, may be a coin hopper for feeding coins to the coin tray 30 to make a pay out to a player when the player wishes to redeem his or her credit.

The bill acceptor 24.2 includes a platen 42 leading to an input slot 44. An illuminating means in the form of an array of light emitting diodes (LED's) 46 is arranged in the platen 42 of the bill acceptor 24.2.

Figure 3:
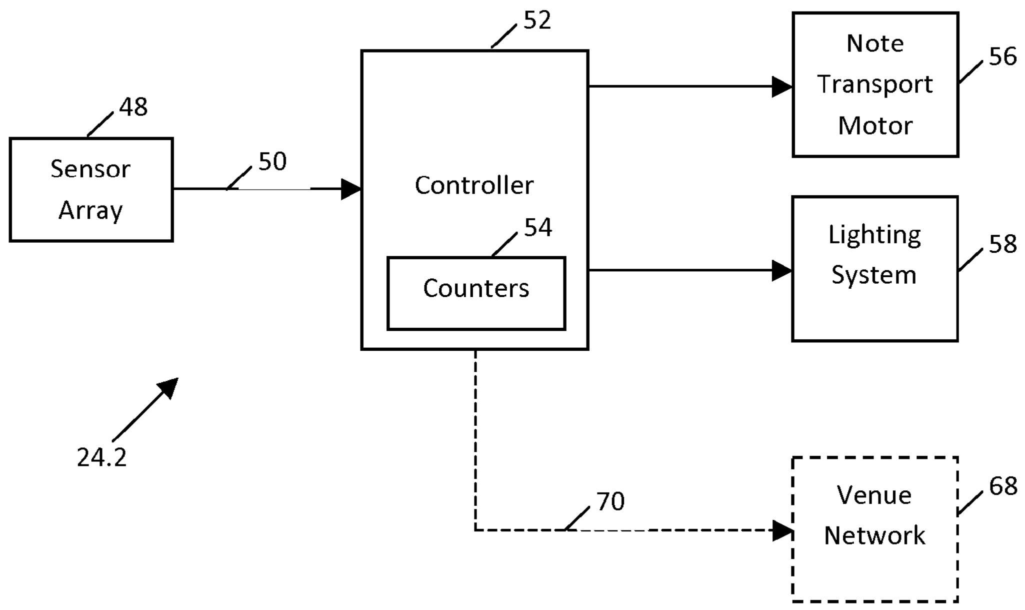
FIG. 3 shows a block diagram of a controller of a bill acceptor of the gaming machine.

The bill acceptor 24.2 further includes a sensing device in the form of a sensor array 48 (FIG. 3). The sensor array 48 senses optical, magnetic and dimensional characteristics or properties of a bill tendered to the bill acceptor 24.2 of the gaming machine 10. The sensor array 48 outputs signals on line 50 to a controller 52. The controller 52 is a bill acceptor controller and communicates with the controller 34 of the gaming machine 10.

The controller 52 includes a group of counters 54. A first counter of the group of counters 54 is incremented each time a bill is accepted by the bill acceptor 24.2.

Accordingly, when a bill is tendered to the bill acceptor 24.2 by being placed on the platen 42 it is received in the slot 44 and is drawn into the sensor array 48 by a transport motor 56 under the action of the controller 52. The bill is then sensed by the sensor array 48 which determines whether or not its optical, magnetic and dimensional properties meet the required criteria. If the bill is accepted, the transport motor 56 is again energised which feeds the bill to a receptacle (not shown) contained within the console 12 of the gaming machine 10. The first counter of the group of counters 54 is incremented by one.

Conversely, if the sensor array 48 determines that the bill is unacceptable, the transport motor 56 is operated in the reverse direction and the note is ejected from the slot 44 of the bill acceptor 24.2. A second counter of the group of counters 54 is incremented by one.

After each tender of a bill, the controller 52 updates its calculation of the bill acceptance rate (BAR) according to the formula:

BAR(%)[A/(A+R)].times.100%, where A=value of first counter of the group of counters 54; and R=value of second counter of the group of counters 54.

When the acceptance rate as determined by the controller 52 is at or above the predetermined threshold, for example, a BAR of 80%, the array of LED's 46 of the bill acceptor 24.2 is energised in a predetermined, first pattern under the action of the controller controlling a lighting system 58.

Figure 4:
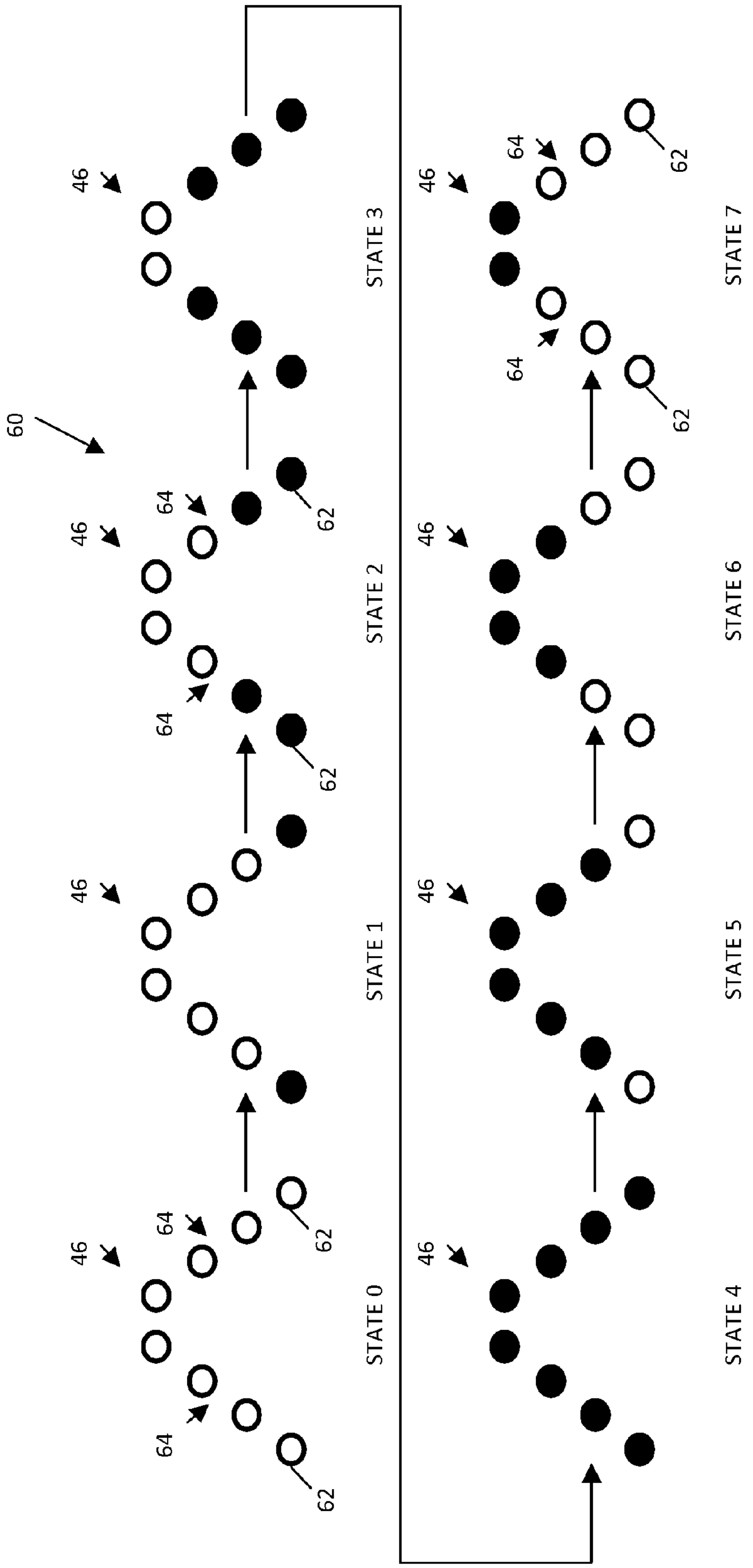
FIG. 4 shows a sequence of illumination of illuminating elements of the bill acceptor of the gaming machine.

A typical pattern is as shown in FIG. 4 of the drawings and is designated generally by the reference numeral 60. The array 46 comprises eight LED's 62 arranged in two converging rows 64. The rows 64 converge towards the slot 44 of the bill acceptor 24.2.

Under the control of the lighting system 58, in State 0, all of the LED's 62 remain de-energised. Thereafter, in a first state, the first LED 62 in each row is energised. By "first" is meant those LED's furthest from the slot 44. In the second state, the first LED's 62 remain energised and the second LED's 62 are also energised. Similarly, in the third and fourth states the third LED 62 in each row 64 and fourth LED 62 in each row 64 are energised, respectively. In State 5, the first LED's 62 are de-energised while the remaining LED's 62 in each row remain energised. In the sixth state, the second LED 62 in each row 64 is de-energised and in the seventh state the third LED 62 in each row is de-energised.

It will be appreciated that this happens reasonably quickly to create the impression of the LED's 62 being illuminated towards the slot 44 to create the impression of something being fed towards the slot 44 to act as an attracting means to a patron wishing to insert a bill into the bill acceptor 24.2.

When the BAR is above the predetermined threshold, the pattern 64 continues indefinitely.

Figure 5:
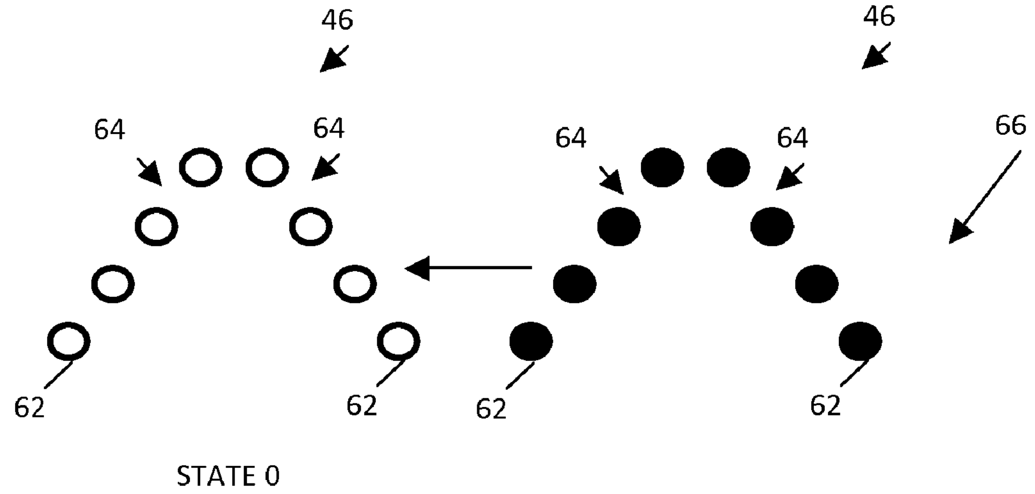
FIG. 5 shows operation of an annunciator of the bill acceptor of the gaming machine.

However, when the BAR drops below the predetermined threshold, upon completion of the pattern 60, a new pattern (as shown by reference numeral 66 in FIG. 5 of the drawings) is interposed between States 7 and 0. In other words, once the last LED 62 in each row 64 of the array 46 has been energised as in the case of State 7, all the LED's 62 in each row 64 are energised before they are all de-energised as is shown for State 0. This new pattern 66 continues to be inter posed between State 7 and State 0 for as long as the BAR remains below the predetermined threshold.

With this arrangement, a technician can, by monitoring the pattern 60, determine whether or not the BAR of the controller 52 is above the required threshold and, if not, is alerted by the annunciator as implemented by the pattern 66 to take the appropriate remedial action.

It is an advantage of the invention that the pattern 66, which functions as the annunciator for the technician, is discrete and that a player playing the gaming machine 10 using other means of credit input, such as coins or a card, is not disturbed by the change in pattern on the bill acceptor 24.2.

The gaming machine 10 may be connected to a network in the venue. In that case, the controller 52 feeds information regarding the BAR to a venue network system 68 (FIG. 3) via a network communications line 70. The system 68 then gives venue operating and service personnel an on-line and immediate indicator of the performance of the bill acceptor 24.2 of each gaming machine 10 enabling remedial action to be taken in an expedited manner when the BAR of any gaming machine in the network drops below the predetermined threshold. The system 68 could, for example, activate a visual or audible alarm (not shown) indicating the need for attention to a bill acceptor 24.2 of any gaming machine on the network.

It is an advantage of the invention that a discrete arrangement is provided for determining the bill acceptance rate of a bill acceptor 24.2 of a gaming machine 10, whether networked or not. It will be appreciated that if the controller 52 has a too high rejection rate of bills, the revenue received by the venue in which the gaming machine 10 is installed could be adversely affected as players may not have coins to play the machine instead. Accordingly, it is important that, when a bill acceptor 24.2 of a gaming machine 10 has an unacceptable high rejection rate, remedial action can be taken urgently.

In addition, the manner in which a technician is alerted to a malfunctioning bill acceptor 24.2 takes place in a discrete manner using the invention so that patrons are not disturbed in their playing of the gaming machine.

The invention claimed is:

1. A bill acceptor for a gaming machine, the bill acceptor comprising:

a receiving zone for receiving a bill;

a sensing device at an input region of the receiving zone for sensing at least one characteristic of the bill;

a controller in communication with the sensing device, the controller configured to receive an output signal from the sensing device, and update a bill acceptance rate based upon the output signal; and an annunciator comprising a plurality of illuminating elements arranged in two rows converging towards a bill acceptance slot;

wherein, in response to determining that the bill acceptance rate is at or above a predefined threshold, the controller causes the illuminating elements to illuminate in a predefined first pattern that gives the impression of something being fed towards the bill acceptance slot; and wherein, in response to determining that the bill acceptance rate is below the predefined threshold, the controller causes the illuminating elements to illuminate in a predefined second pattern that is different from the first pattern such that the annunciator provides discreet notification that the bill acceptance rate is above or below the predefined threshold.

2. The bill acceptor of claim 1, in which the receiving zone incorporates a platen on which the bill is received and the bill acceptance slot at an end of the platen into which the bill is to be inserted.

3. The bill acceptor of claim 2, in which the sensing device is arranged inwardly of the slot.

4. The bill acceptor of claim 1, in which the sensing device senses at least one of optical, magnetic and dimensional characteristics of the bill.

5. The bill acceptor of claim 1, in which the annunciator is arranged in the receiving zone.

6. The bill acceptor of claim 1, in which the second pattern is activated after completion of the first pattern when the bill acceptance rate has dropped below said predetermined threshold.

7. The bill acceptor of claim 1, in which, when the controller is connected to a network, a network monitoring system monitors the acceptance rate through the controller and activates an alarm when the acceptance rate drops below the predefined threshold.

8. A method of operating a bill acceptor of a gaming machine, the method including the steps of:

sensing at least one characteristic of a bill inserted into the bill acceptor;

monitoring a bill acceptance rate by a controller;

in response to determining that the bill acceptance rate is at or above a predefined threshold, illuminating elements of an annunciator that comprises a plurality of elements arranged in two row converging towards a bill acceptor slot in a predefined first pattern that gives the impression of something being fed towards the bill acceptance slot; and in response to determining that the bill acceptance rate is below the predefined threshold, the illuminating elements of the annunciator in a predefined second pattern that is different from the first pattern such that the annunciator provides discreet notification that the bill acceptance rate is above or below the predefined threshold.

9. The method of claim 8, in which the second pattern of illumination of the illuminating elements follows completion of the first pattern.

10. The method of claim 8, which includes transmitting a signal on a network to which the gaming machine is connected to a network monitoring system to activate an alarm when the bill acceptance rate drops below said predefined threshold.

* * * * *